United States Patent
Lee

(10) Patent No.: US 7,057,699 B2
(45) Date of Patent: Jun. 6, 2006

(54) SEAL PATTERN FOR LIQUID CRYSTAL DISPLAY DEVICE

(75) Inventor: Jong-Chil Lee, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/001,175

(22) Filed: Dec. 2, 2004

(65) Prior Publication Data

US 2005/0094085 A1 May 5, 2005

Related U.S. Application Data

(62) Division of application No. 10/224,566, filed on Aug. 21, 2002, now Pat. No. 6,844,911.

(30) Foreign Application Priority Data

Aug. 21, 2001 (KR) ............................... 2001-50474

(51) Int. Cl.
*G02F 1/1339* (2006.01)
(52) U.S. Cl. ..................................... 349/153; 349/190
(58) Field of Classification Search .............. 349/153, 349/190, 155; 438/30
See application file for complete search history.

(56) References Cited

U.S. PATENT DOCUMENTS

| 4,466,701 A * | 8/1984 | Ogata et al. ................. 349/153 |
| 5,410,423 A * | 4/1995 | Furushima et al. .......... 349/190 |
| 5,499,127 A * | 3/1996 | Tsubota et al. .............. 349/153 |
| 6,010,384 A | 1/2000 | Nishino et al. ................ 445/24 |
| 6,195,149 B1 * | 2/2001 | Kodera et al. ............... 349/187 |
| 6,388,729 B1 * | 5/2002 | Ahn et al. ................... 349/190 |
| 6,466,294 B1 * | 10/2002 | Yamagishi et al. .......... 349/155 |
| 6,473,147 B1 * | 10/2002 | Nakahara et al. ........... 349/153 |
| 6,542,215 B1 * | 4/2003 | Lee et al. .................... 349/153 |
| 6,573,115 B1 * | 6/2003 | Kwak et al. ................... 438/30 |
| 2001/0004281 A1 * | 6/2001 | Sasaki ......................... 349/190 |

* cited by examiner

*Primary Examiner*—Huyen Ngo
(74) *Attorney, Agent, or Firm*—McKenna Long & Aldridge LLP

(57) ABSTRACT

A seal pattern on a substrate for a liquid crystal display device includes a plurality of main seal patterns along first and second direction, a dummy seal pattern between the adjacent main seal patterns along the first direction, a first sub-seal pattern surrounding the plurality of main seal patterns, and a second sub-seal pattern at an exterior of the first sub-seal pattern, the second sub-seal pattern corresponding to a borderline between the adjacent main seal patterns along the second direction.

6 Claims, 4 Drawing Sheets

SEAL PATTERN FOR LIQUID CRYSTAL DISPLAY DEVICE

This application is a divisional of prior application Ser. No. 10/224,566, filed Aug. 21, 2002 now U.S. Pat. No. 6,844,911.

This application claims the benefit of Korean Patent Application No. 2001-50474, filed on Aug. 21, 2001 in Korea, which is hereby incorporated by reference for all purposes as if filly set forth herein.

BACKGROUND OF THE INVENTION

1. Field of the Invention

The present invention relates to a liquid crystal display (LCD) device and more particularly, to a seal pattern for a liquid crystal display (LCD) device.

2. Discussion of the Related Art

Recently, liquid crystal display (LCD) devices have been widely used for notebook computers and desktop monitors, etc. because of their superior resolution, color image display and quality of displayed images. In general, an LCD device has an upper substrate and a lower substrate, which are spaced apart and facing each other, and a liquid crystal layer disposed between the upper and lower substrates. Each of the substrates includes an electrode and the electrodes of each substrate are also facing each other. The LCD device uses an optical anisotropy of liquid crystal and produces an image by controlling light transmissivity by varying the arrangement of liquid crystal molecules, which are arranged by electric field.

Because LCDs have high resolution and can display an excellent moving image are widely used. LCD devices typically include thin film transistors and pixel electrodes arranged in a matrix form. The LCD device is referred to as an active matrix liquid crystal display (AMLCD).

A conventional liquid crystal display (LCD) device will be described hereinafter in more detail with reference to FIG. 1. FIG. 1 is a cross-sectional view illustrating a conventional LCD device. In FIG. 1, the conventional LCD device has upper and lower substrates 10 and 30, which are spaced apart and facing each other, and also has a liquid crystal layer 50 interposed between the upper and lower substrates 10 and 30.

A gate electrode 32 is formed on the inside of the lower substrate 30, and a gate insulator 34 covers the gate electrode 32. An active layer 36 is formed on the gate insulator 34, and an ohmic contact layer 37 is formed on the active layer 36. Next, source and drain electrodes 38 and 40 are formed on the ohmic contact layer 37. The gate electrode 32, the source electrode 38, and the drain electrode 40 make a thin film transistor "T". The active layer 38 between the source and drain electrodes 38 and 40 becomes a channel "CH" of the thin film transistor "T". Also, a gate line (not shown), which is connected to the gate electrode 32, and a data line (not shown), which is connected to the source electrode 38, are formed crossing each other, and the gate and data lines define a pixel region "P".

Next, a passivation layer 42 is formed on the source and drain electrodes 38 and 40. The passivation layer 42 has a contact hole 44 exposing the drain electrode 40. A pixel electrode 46 is formed in the pixel region "P" on the passivation layer 42. The pixel electrode 46 is connected to the drain electrode 40 through the contact hole 44, and is made of a transparent conductive material such as Indium-Tin-Oxide (ITO) or Indium Zinc Oxide (IZO). A first alignment layer 48, which determines initial arrangement of the liquid crystal layer 50, is formed on the pixel electrode 46.

A black matrix 12, which has an opening corresponding to the pixel electrode 46, is formed on the inside of the upper substrate 10. A color filter 14 corresponding to the opening of the black matrix 12 is formed on the black matrix 12. The color filter 14 includes three colors: red (R), green (G) and blue (B). Each color corresponds to respective pixel electrodes 46. Subsequently, a transparent common electrode 16 is formed on the color filter 14, and a second alignment layer 18 is formed on the common electrode 16.

The liquid crystal layer 50 is disposed between the first and second alignment layers 48 and 18. A seal pattern 52, also, is formed between the first and second alignment layers 48 and 18.

The LCD device is fabricated by the processes of forming a lower substrate, referred to as an array substrate, having thin film transistors (TFTs) and pixel electrodes; forming an upper substrate, referred to as a color filter substrate, having common electrodes and color filters; forming a liquid crystal cell by aligning and attaching the substrates; injecting the liquid crystal materials and sealing; and attaching a polarization film.

In a conventional LCD device, since a plurality of liquid crystal cells are simultaneously formed on a wide area substrate, a process of cutting the substrate into the unit liquid crystal cells is needed after an assembly process.

FIG. 2 is a flow chart illustrating a fabrication process of a conventional liquid crystal cell for an LCD device.

At step ST1, the array and color filter substrates are prepared to include TFTs and color filters, respectively. The array substrate is formed by repeating steps of depositing and patterning a thin film by using several masks. Recently, a fabrication process that reduces cost by decreasing the number of masks has been investigated. The color filter substrate is formed by subsequently making a black matrix, red (R)/green (G)/blue (B) color filters and a common electrode. The black matrix separates the color filters and prevents light leakage of a non-pixel area. The color filter can be formed by a dyeing method, a printing method, a pigment dispersion method or an electro-deposition method. The pigment dispersion method is most widely employed.

At step ST2, alignment layers that determine an initial orientation of the liquid crystal layer are formed on the upper and lower substrates, respectively, after the array and color filter substrates are cleaned to remove particles thereon. This step includes depositing, curing, and aligning a polymeric thin film along a specific direction. An organic material of the polyimide series is mainly used as the alignment layer, and a rubbing method is mainly used as the aligning method of the alignment layer. The rubbing method consists of rubbing the alignment layer along the specific direction by a rubbing cloth, and has advantages such as easy orientation treatment, suitability to mass production, high stability of the orientation and easy controllability of a pre-tilt angle. Other methods, including photo-alignment, are also possible.

At step ST3, a seal pattern, which forms a gap for liquid crystal material injection and prevents leakage of the liquid crystal material, is formed on one substrate. The seal patterning process involves forming a desired pattern by application of a thermosetting resin. A screen print method using a screen mask and a seal dispenser method using a dispenser are used for the seal patterning process. For the simplicity of fabrication, the screen print method has mainly been used. However, since the screen mask is not suitable for a wide substrate and a contamination by contact between the mask and the alignment layer often occurs, use of the seal dispenser method has gradually increased.

Next, a spacer having a specific size to maintain a precise and uniform gap between the upper and lower substrates is deposited by spraying the spacer onto one of the upper and lower substrates. The spacer spray method can be divided into two different types: a wet spray method that involves spraying a mixture of alcohol and spacer material and a dry spray method that involves spraying spacer material alone. Furthermore, the dry spray method can be sub-divided into two different types: an electrostatic spray method that uses electrostatic force, and a non-electric spray method that uses gas pressure. Since the liquid crystal cell structure is susceptible to damage from static electricity, the non-electric method is mainly used.

At step ST4, the array and color filter substrates are arranged and attached by pressure-resistant hardening of the seal pattern. The aligning accuracy of the substrates is decided by a margin and the aligning accuracy of several micrometers is required.

At step ST5, the attached liquid crystal substrate is divided into unit cells. A cell cutting process includes a scribe process that forms cutting lines on a surface of the substrate using a diamond pen or a cutting wheel of tungsten carbide, a hardness of which is higher than a hardness of the glass substrate, and a break process that divides the unit cells by force.

At step ST6, a liquid crystal material is injected into the unit cells. A vacuum injection method using pressure difference between the inside and outside of the unit cells is commonly used as an effective injection method. Since fine air bubbles included in the liquid crystal material can deteriorate the display property of the unit cells, a bubble-eliminating process, in which the cells are kept in a vacuum state for a long period of time, is required.

After finishing the liquid crystal material injection, an injection hole is sealed to prevent leakage of the liquid crystal material. Generally, a ultra violet (UV) curable resin is deposited onto the injection hole by use of a dispenser and then ultra violet light is irradiated onto the resin, thereby hardening the resin and sealing the injection hole. Polarization films are attached on outer surfaces of the unit cell, and a driving circuit is connected to the unit cell using an attachment process.

As stated above, a plurality of liquid crystal cells generally are formed in a glass substrate and are separated from each other by cutting.

FIG. 3 is a schematic plan view of a glass substrate including a plurality of liquid crystal cells according to the related art. As shown in the figure, twenty (20) unit cells 62, each of which has 4-inch size, are formed in the glass substrate 60 having an area of 370×470 mm². The unit cells 62 have a specific distance, which is referred to as a shaded portion 64, therebetween. The shaded portion 64 indicates a region in which dummy seal patterns (not shown) are formed, and a dotted line "C" shows a line for cutting of cell at step ST5 of FIG. 2.

The structure of liquid crystal cell is explained in more detail with reference to FIG. 4. FIG. 4 is a plan view magnifying the region "A" of FIG. 3. In FIG. 4, each unit cell has a main seal pattern 72, which includes an injection hole 72a to inject a liquid crystal material into the main seal pattern 72. Dummy seal patterns 74 are formed around the main seal pattern 72, i.e. in the shaded portion 64, and surrounding the main seal patterns 72. Each dummy seal pattern 74 is disconnected from each other dummy seal pattern 74 in a region corresponding to each edge of the main seal pattern 72, and the dummy seal pattern 74 is also disconnected at a part corresponding to the injection hole 72a of the main seal pattern 72. The dummy seal patterns 74 have not only the function of protecting the main seal pattern 72 from outer materials but also the function of preventing a breakdown of the glass substrate 60 of FIG. 3 during cutting process.

By the way, the number of unit cells is limited because of the space occupied by the dummy seal patterns 74. Additionally, since the glass substrate 60 including the dummy seal patterns 74 needs several cutting lines "C" according to each unit cells 62 of FIG. 3 and the dummy seal patterns 74 are removed after cutting process, the number of processes increases.

SUMMARY OF THE INVENTION

Accordingly, the present invention is directed to a seal pattern for a liquid crystal display (LCD) device that substantially obviates one or more of problems due to limitations and disadvantages of the related art.

An advantage of the present invention is to provide a seal pattern for a liquid crystal display (LCD) device that prevents breakdown of a substrate and increases the utility factor of the substrate.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a seal pattern on a substrate for a liquid crystal display device includes a plurality of main seal patterns disposed along first and second direction, a dummy seal pattern between the adjacent main seal patterns disposed along the first direction, a first sub-seal pattern surrounding the plurality of main seal patterns, and a second sub-seal pattern at an exterior of the first sub-seal pattern, the second sub-seal pattern corresponding to a borderline between the adjacent main seal patterns disposed along the second direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
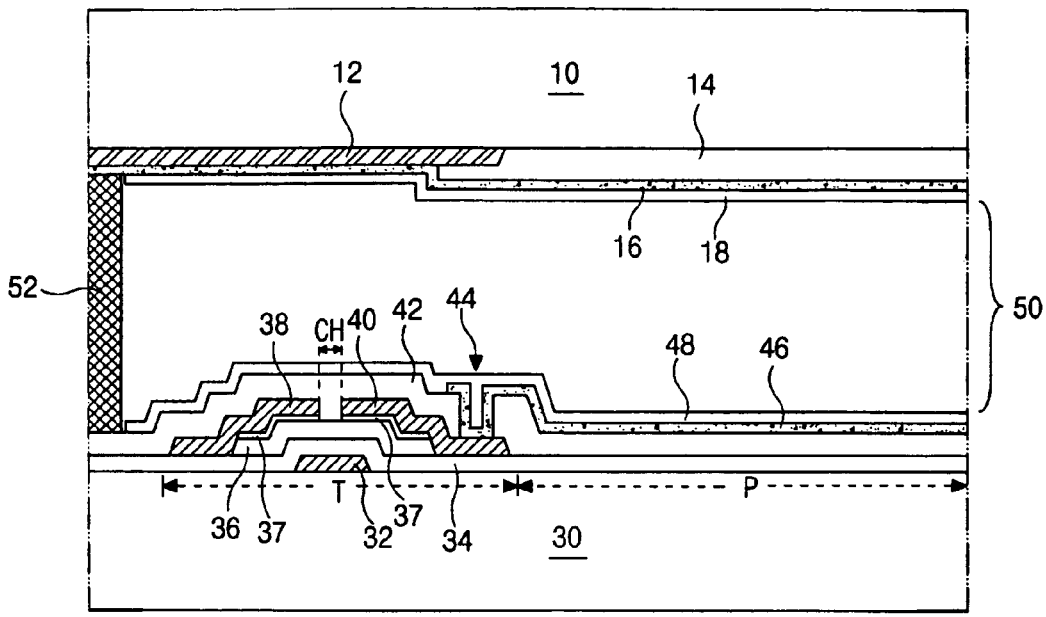
FIG. 1 is a cross-sectional view of a conventional liquid crystal display (LCD) device.
Figure 2:
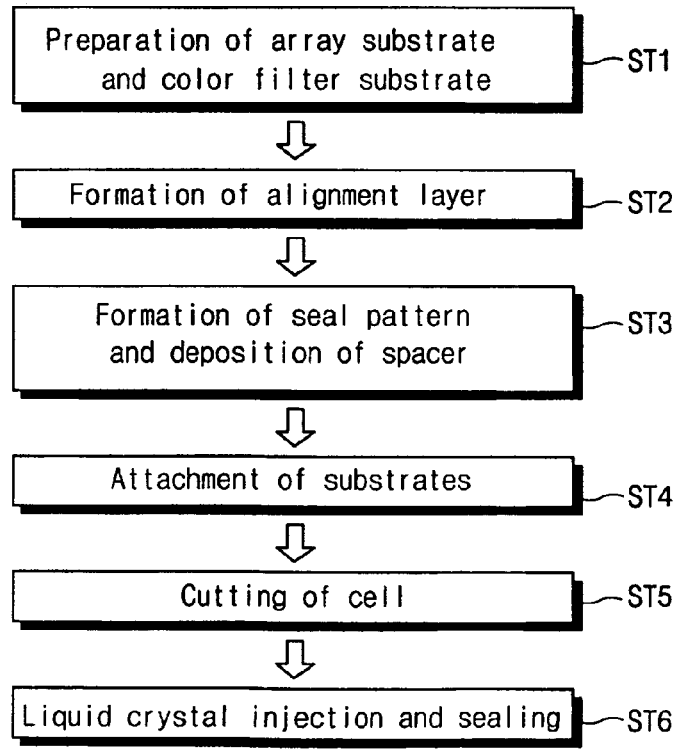
FIG. 2 is a flow chart illustrating a fabrication process of a conventional liquid crystal cell for an LCD device.
Figure 3:
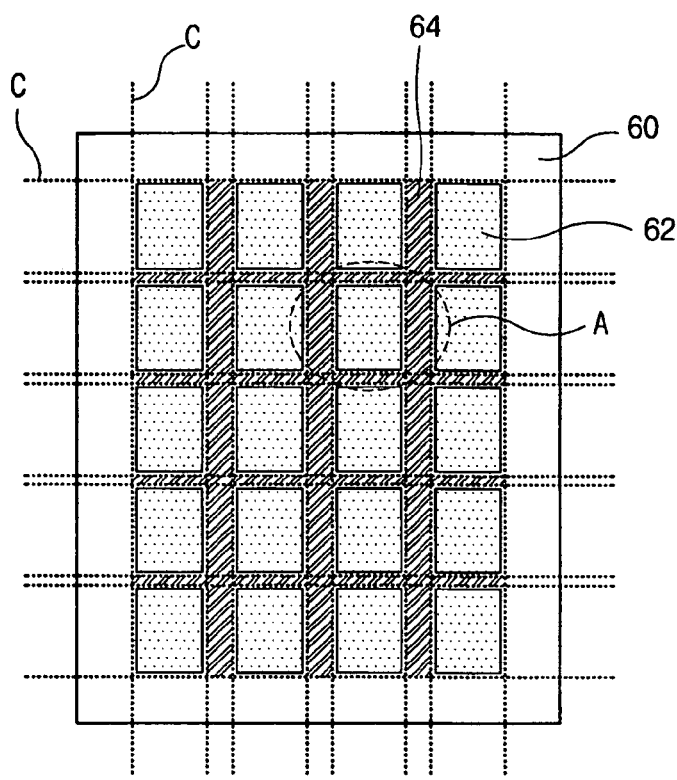
FIG. 3 is a schematic plan view of a glass substrate including a plurality of liquid crystal cells according to the related art.
Figure 4:
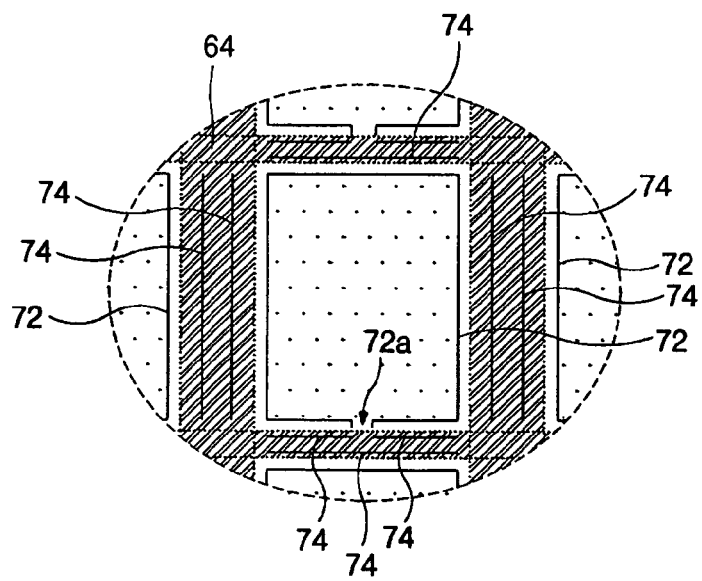
FIG. 4 is a plan view magnifying the region "A" of FIG. 3.
Figure 5:
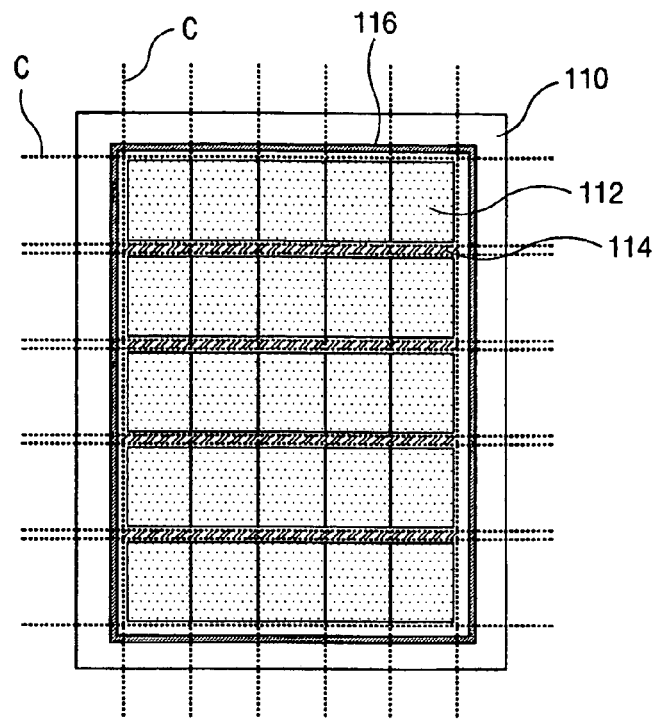
FIG. 5 is a schematic plan view of a glass substrate including a plurality of liquid crystal cells according to a first embodiment of the present invention.

FIG. 5 is a schematic plan view of a glass substrate including a plurality of liquid crystal cells according to a first embodiment of the present invention. As shown in the figure, twenty-five (25) unit cells 112 of five by five, each of which has 4-inch size, are formed in a glass substrate 110 having an area of 370×470 mm². The unit cells 112 horizontally adjoin each other and vertically have a definite space 114 therebetween in the context of the figure. In the space 114 indicated as a shaded portion in FIG. 5, dummy seal patterns (not shown) are formed, and a dotted line "C" shows a line for cutting of cell. Meanwhile, a sub-seal pattern 116 is formed outside of the unit cells 112 in order to prevent a breakdown of the glass substrate 110 during cutting process, and surrounds the unit cells 112. In the first embodiment, since more unit cells are manufactured at a time, the utility factor of the glass substrate 110 rises. Also, a process time decreases due to a reduction of the cutting line "C", i.e. the number of cuts.

However, the glass substrate of the first embodiment may bend during the cutting process because there is no dummy seal pattern between horizontally neighboring unit cells. Therefore, breakdown of the glass substrate may occur.

Figure 6:
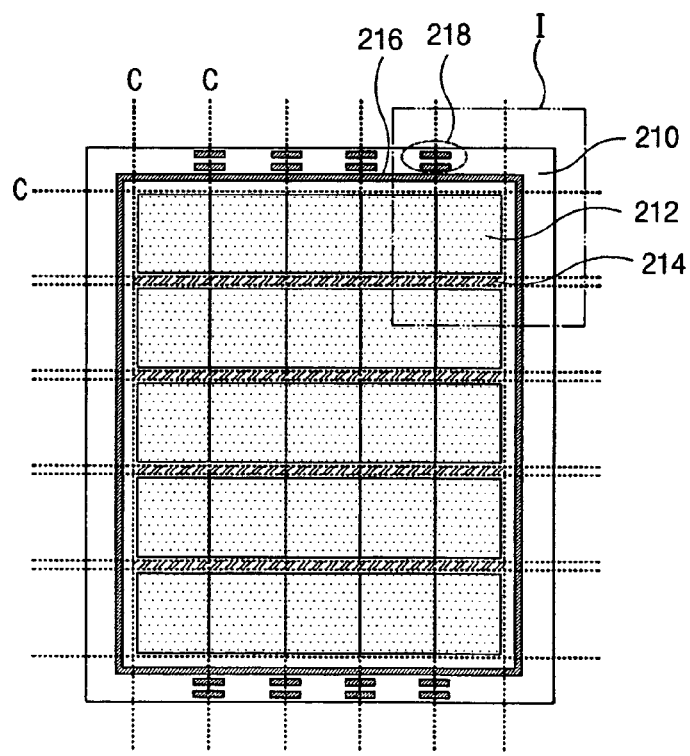
FIG. 6 is a schematic plan view of a glass substrate including a plurality of liquid crystal cells according to a second embodiment of the present invention.
Figure 7:
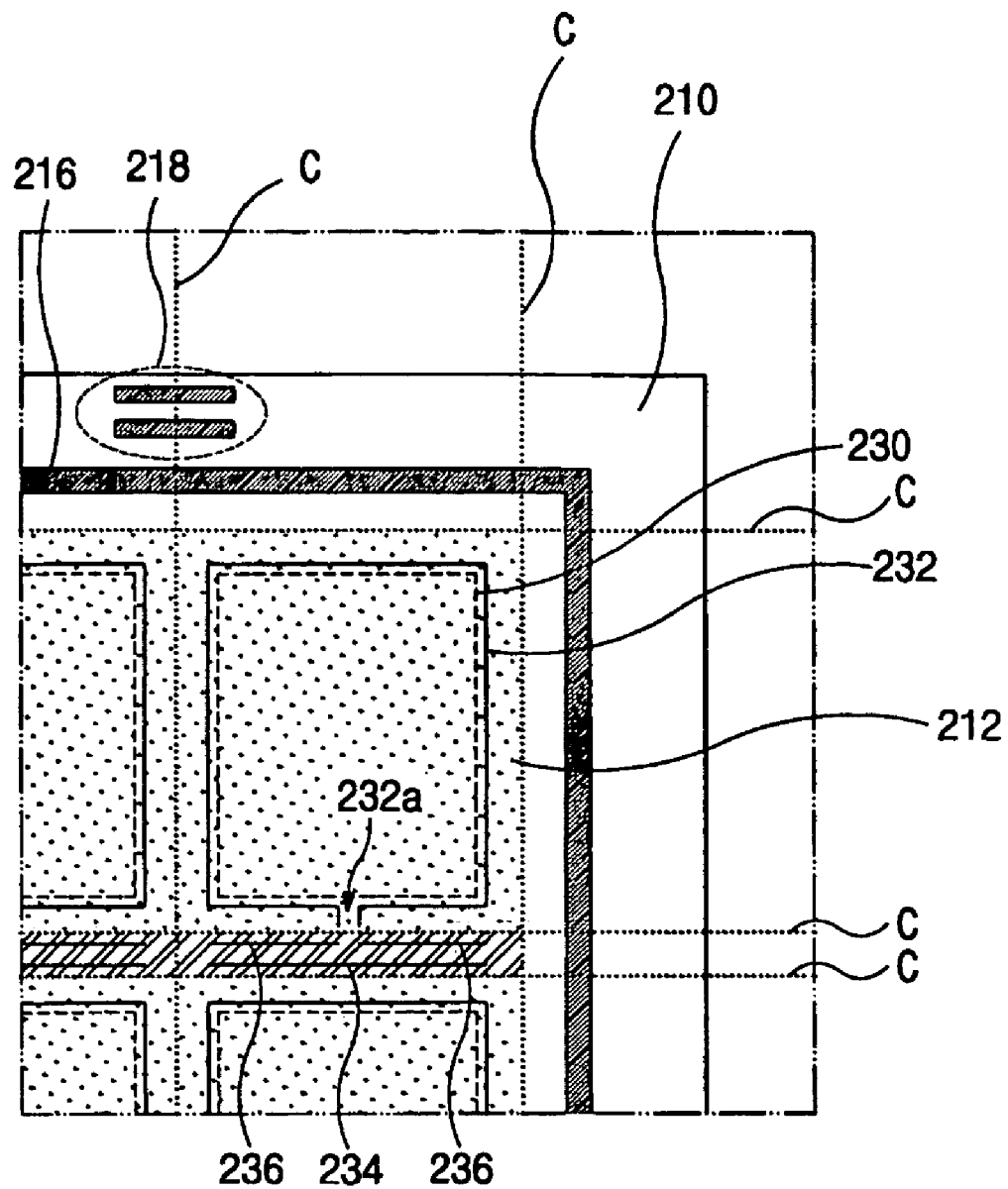
FIG. 7 is a plan view magnifying the region "I" of FIG. 6.

FIG. 6 is a schematic plan view of a glass substrate including a plurality of liquid crystal cells according to a second embodiment of the present invention, and FIG. 7 is a plan view magnifying the region "I" of FIG. 6. As shown in FIGS. 6 and 7, twenty-five (25) unit cells 212 of five by five, each of which has 4-inch size, are formed in a glass substrate 210 having an area of 370×470 mm². The unit cells 212 horizontally adjoin each other and vertically have a definite space 214 therebetween in the context of the figure. A main seal pattern 232 is formed in the unit cell 212, and the inside of the main seal pattern 232 is defined as an active area 230. The main seal pattern 232 includes an injection hole 232a to inject a liquid crystal material into the active area defined by the main seal pattern 232. In the space 214 indicated as a shaded portion, dummy seal patterns 234 and 236 are formed horizontally in the context of the figure to protect the main seal pattern 232 from outer materials and to prevent a breakdown of the glass substrate 210 during cutting process. The dummy seal pattern 236 close by the injection hole 232a of the main seal pattern 232 is disconnected at a region corresponding or adjacent to the injection hole 232a. Here, a dotted line "C" shows a line for cutting of cell.

A first sub-seal pattern 216 is formed outside of the unit cells 212, and surrounds the unit cells 212. A second sub-seal pattern 218 of two lines is formed horizontally in the context of the figure outside of the first sub-seal pattern 216 on the glass substrate 210. The second sub-seal pattern 218 crosses with the vertical cutting line "C" corresponding to the boundary of the unit cells 212 adjoining horizontally in the context of the figure. The second sub-seal pattern 218 may have a shape other than that of the second embodiment. That is, the second sub-seal pattern 218 can be made of a thicker line than that of FIG. 6, or made of thinner and more lines than that of FIG. 6. The first and second sub-seal patterns 216 and 218 may be made of either a thermosetting resin or a photocuring resin. Here, the thermosetting resin includes a glass fiber.

On the other hand, the glass substrate 210 may be either an array substrate or a color filter substrate.

Also, it is possible that the dummy seal patterns 234 and 236 can be used without also using the first and second sub-seal patterns 216 and 218. It is possible that the first and second sub-seal patterns 216 and 218 can be used without also using the dummy seal patterns 234 and 236. Other combinations of the first and second sub-seal patterns 216 and 218 and the dummy seal patterns 234 and 236 are also possible.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A seal pattern on a substrate for a liquid crystal display device, comprising:
    a plurality of main seal patterns along first and second directions;
    a dummy seal pattern between the adjacent main seal patterns along the first direction;
    a first sub-seal pattern surrounding the plurality of main seal patterns; and
    a second sub-seal pattern at an exterior of the first sub-seal pattern, the second sub-seal pattern corresponding to a borderline between the adjacent main seal patterns disposed along the second direction.

2. The seal pattern according to claim 1, wherein the second sub-seal pattern includes two parallel lines.

3. The seal pattern according to claim 1, wherein the main seal pattern has an injection hole, and the dummy seal pattern includes a first dummy seal pattern and a second seal dummy pattern.

4. The seal pattern according to claim 3, wherein the first dummy seal pattern is disconnected at a region corresponding to the injection hole.

5. The seal pattern according to claim 1, wherein the first and second sub-seal patterns include a thermosetting resin.

6. The seal pattern according to claim 5, wherein the first and second sub-seal patterns include a glass fiber.

* * * * *